(12) United States Patent
Albergaria

(10) Patent No.: US 11,453,352 B2
(45) Date of Patent: Sep. 27, 2022

(54) ILLUMINATED REMOVABLE 3D ACCENTS FOR LICENSE PLATES AND FRONTAL AND LATERAL ATTACHMENTS

(71) Applicant: Carlos T Albergaria, Winter Springs, FL (US)

(72) Inventor: Carlos T Albergaria, Winter Springs, FL (US)

(73) Assignee: Carlos T. Albergaria, Winter Springs, FL (US)

( * ) Notice: Subject to any disclaimer, the term of this patent is extended or adjusted under 35 U.S.C. 154(b) by 0 days.

(21) Appl. No.: 15/871,789

(22) Filed: Jan. 15, 2018

(65) Prior Publication Data

US 2019/0217789 A1 Jul. 18, 2019

(51) Int. Cl.
*B60Q 1/56* (2006.01)
*B60R 13/00* (2006.01)
*F21V 21/00* (2006.01)
*F21S 43/19* (2018.01)
*F21S 43/14* (2018.01)
*F21Y 115/10* (2016.01)
*F21W 104/00* (2018.01)

(52) U.S. Cl.
CPC ............ *B60R 13/005* (2013.01); *F21S 43/14* (2018.01); *F21S 43/19* (2018.01); *F21V 21/00* (2013.01); *F21W 2104/00* (2018.01); *F21Y 2115/10* (2016.08)

(58) Field of Classification Search
CPC ..... B60R 13/005; F21V 21/00; F21V 3/0472; F21S 43/14; F21S 43/19
USPC .................. 248/682; 362/97.1, 487, 497, 382
See application file for complete search history.

(56) References Cited

U.S. PATENT DOCUMENTS

| | | | |
|---|---|---|---|
| 8,752,989 B2 * | 6/2014 | Roberts | G09F 13/06 362/509 |
| 9,452,708 B2 * | 9/2016 | Salter | G09F 21/04 |
| 9,656,592 B1 * | 5/2017 | Buttolo | B60Q 1/50 |
| 2016/0201874 A1 * | 7/2016 | Stemmer | F21V 3/10 362/555 |
| 2019/0186178 A1 * | 6/2019 | Moriwaki | E05B 79/22 |
| 2019/0301698 A1 * | 10/2019 | Dawidziuk | F21S 41/00 |

* cited by examiner

*Primary Examiner* — Todd M Epps
(74) *Attorney, Agent, or Firm* — Andrew Rapacke

(57) ABSTRACT

The present invention provides a system of attachments and interchangeable emblems that can be illuminated and that can be placed in different location around a license plate or novelty plate to a vehicle, chosen by the user.
Multiple attachments may be placed around the license plate, each suitable for receiving and tightly holding any regular or illuminated protuberance extending from an emblem, so that the emblem may be secured to the attachment. The emblem or attachment may also be removed and repositioned in a new position selected by the user. These options also allow choices based on aesthetic preference, situational fit requirements for the vehicle, and visibility requirements for government issued tags or plate features.

10 Claims, 4 Drawing Sheets

ILLUMINATED REMOVABLE 3D ACCENTS FOR LICENSE PLATES AND FRONTAL AND LATERAL ATTACHMENTS

TECHNICAL FIELD

The present invention relates to specialized attachments which can connect to a plate, such as a license plate, or novelty plate to a vehicle, while supporting one or more emblems which may be illuminated and which may be secured to the attachments on the license plate in multiple possible locations or directly on novelty plates. In this manner, the user of the attachments may easily position the emblem, choosing from multiple possible options for aesthetic preference or to meet legal requirements for the display of the license plate.

BACKGROUND

All fifty United States and many countries and provinces worldwide require government-issued license plates be attached to the rear of the motor vehicles operating within their borders. In addition, some states and countries require license plates to be attached to the front of the vehicles as well.

Because of these requirements, motor vehicle manufacturers typically provide a standard method and space for attaching such license plates to the vehicles. In jurisdictions where license plates are not required in the front, car owners often choose to attach a decorative plate, sometimes called a vanity plate or novelty plate, to the front of the vehicle in the space provided by the manufacturer of the vehicle for a license plate.

Vehicle owners often choose to decorate around the license plate or novelty plate with a stylized frame that surrounds the plate and adds aesthetic appeal. Such frames are typically rectangular in shape, with the frame surrounding an open area through which the plate can be viewed. The frame is frequently attached to the vehicle with screws or other connecting mechanisms which hold the license plate on the vehicle.

License plate frames are available in a wide variety of designs. By way of example, U.S. Design Pat. D602,831 and D602,832 describe particular designs for license plate frames. A license plate frame sold by Chroma Graphics allows the user to select a two-dimensional ornament and place that ornament in one of several pre-determined locations on the frame with a permanent adhesive. Because of the nature of the adhesive mechanism, the ornament does not have the flexibility of extending beyond the license plate frame, and can-not be so easily removed and repositioned after it is initially stuck to the frame.

U.S. Design Pat. D593,917 describes a stylized frame with decorations related to the game of golf. The golf Design Pat. '917 is an example of a frame which includes a three-dimensional emblem attached to a border of the frame, which emblem extends beyond the borders of the rectangular base frame. While frames with three-dimensional emblems have an aesthetic appeal, the emblems may present problems if a portion of the emblem extends beyond the space allowed on the vehicle for a license plate, possibly resulting in the emblem encountering a vehicle component, such as a part of a bumper, tail light, or body flair. Such stylized frames which fit some vehicles may not fit others, making it desirable that the frame itself have flexible components to fit various spaces.

U.S. Design Pat. D488,752 describes a stylized novelty license plate with a three-dimensional emblem attached to it, this kind of novelty plate does not have the flexibility of extending beyond the novelty license plate, and the emblems cannot be removed and repositioned after it is initially stuck to the frame.

Many government entities require that particular information on the license plate, such as the identity of the state issuing the plate, the number associated with that particular vehicle, or the tags that are often provided as proof of current registration, be viewable without being obscured by a frame.

Depending on the particular license plate and regulations of the applicable government entity, the identifiers that cannot be obscured are in different places on different license plates.

For frames with emblems that extend into or over portions of the license plate, problems may occur when the emblem obscures a portion of a license plate which is legally required to be visible.

As a result, some license plate frames are acceptable for some vehicles and not for others, or meet legal requirements in some jurisdictions and not in others. It is desirable to have an attachment suitable for connecting a license plate to a vehicle, which attachment can be customized by placing two or three dimensional decoration or emblem on the attachment in one of multiple possible positions. In this manner, the owner of the vehicle can select a position for the emblem which is aesthetically pleasing, permits the plate to be viewed without obscuring important information on the plate, and fits into the allowed space on the vehicle and also the owner vehicle can select a have the emblem illuminated in different color, using the removable LED light.

SUMMARY OF THE INVENTION

A primary object of the present invention is to provide a method of decorating a license plate or novelty plate on a vehicle which method allows a user to place an interchangeable emblem or ornamental feature which can also be illuminated on the attachment in a location chosen by the user on or behind the license plate or novelty plate.

Another object of the present invention is to provide attachments for securing a plate to a vehicle which attachment can be easily customized by the user to support a two or three dimensional emblem chosen by the user in a location and orientation which is aesthetically pleasing to that user. Yet another object of the present invention is to provide attachments which can be customized by the user to support an emblem in a location that does not obscure information presented on the plate held in place on the vehicle by the frame.

Yet another object of the present invention is to provide attachments on which a user can select a location for an emblem to avoid interference with adjacent components of the vehicle.

Yet another object of the present invention is to provide an interchangeable attachment that can provide housing for an optional LED light and also the base for interchangeable 2D or 3D art that will sit on top of a replaceable cover top.

These objects are achieved by a device consisting of an attachment or attachments, one or more specialized emblems, and an attachment mechanism for connecting an interchangeable emblem and house and optional LED light in the attachment's base in a manner which allows the user to choose the location for the emblem. The attachment mechanism provides flexibility for positioning the emblem and allows the emblem to be removed from the frame and attached in a different position in another attachment and connection means for connecting the attachment to a vehicle between the license plate and novelty plate or directly on a novelty plate and the vehicle. Numerous attachment mechanisms are possible.

The main attachment that may house an optional LED light and the removable and interchangeable 2d or 3d emblems can be either connected directly to a novelty license plate via glue or adhesive or connected also via glue or screws when connected to the side and lower front attachments which are placed behind the license plate by a connection mechanism which may be one of several known in the prior art for connecting two components together, typically involving a screw placed through a hole in the attachment, a hole in the plate, and a hole in the vehicle in a place suitable for mounting a required license plate.

The emblem or emblems may be of a variety of designs, shapes and sizes, including but not limited to fanciful patterns, logos, or replicas of sports equipment, animals, or other objects. The user may select an emblem which appeals to that user.

The emblem is then attached to the base attachment with one or more attachment mechanisms. Because of the flexibility of the attachment mechanism, the emblem may be attached to the license plate in one of multiple possible positions. Depending on the specific configuration of the emblem, the emblem may be attached to the bottom, top left side, or right side, left middle, or right side of a license plate, via attachments or directly into a novelty license plate. Matching or contrasting emblems may be selected and attached at different positions on the same license plate. If the user decides that a different position would be advantageous, the emblem can be removed and repositioned in a new location with respect to the attachment or plate.

DETAILED DESCRIPTION

The Present invention provides attachments for securing removable or fixed emblems to a vehicle's license or novelty plates, with the unique feature of allowing one or more emblems to be removable and optionally illuminated and secured to the license or novelty plate in more than one possible position.

In the following description, numerous specific details are set forth in order to provide a thorough understanding of the present invention. It will be obvious, however, to one skilled in the art that the present invention may be practiced with variations to or even without one or more of these specific details. Some well-known methods and structures have not been set forth in order not to unnecessarily obscure the description of the present invention.

Figure 1:
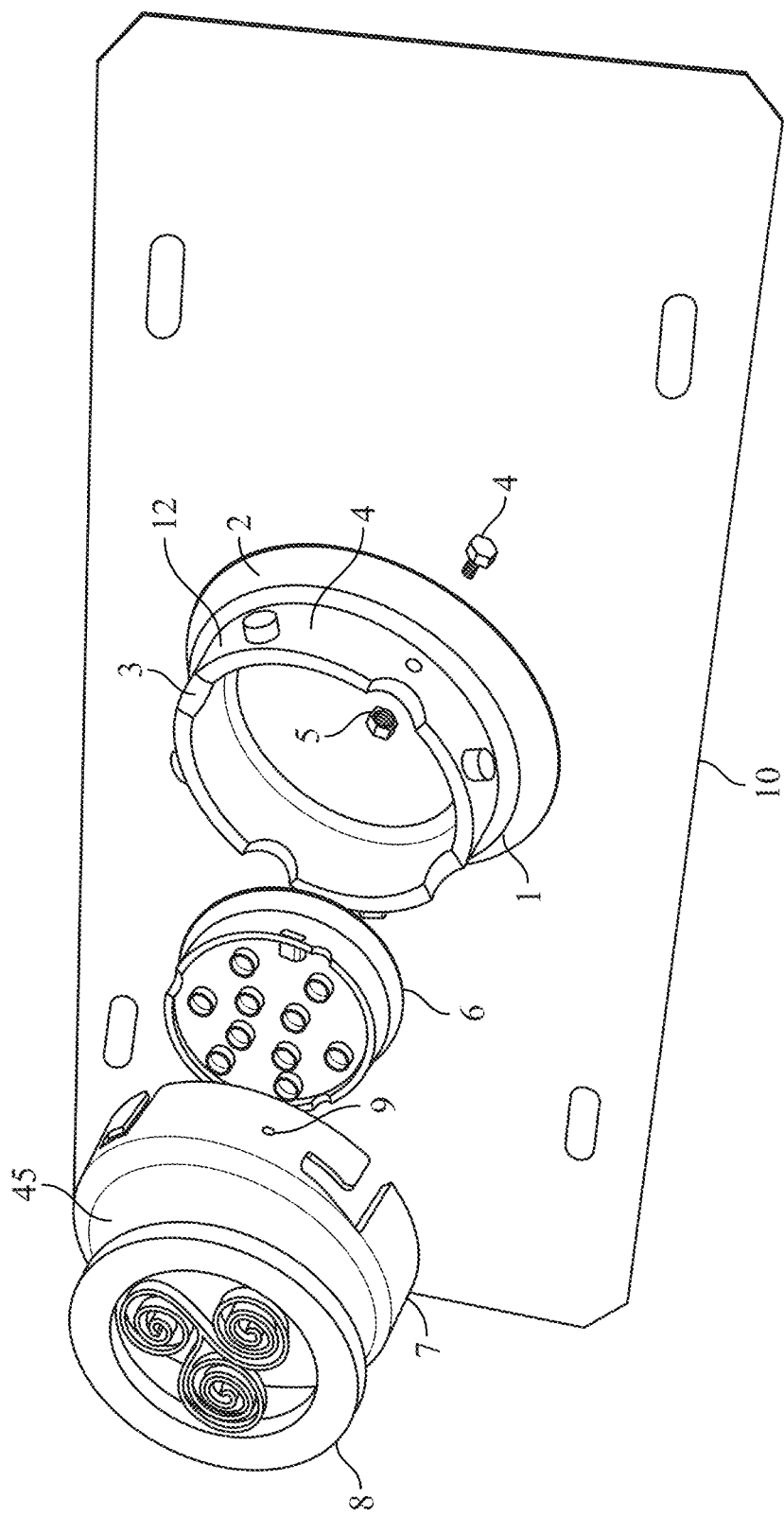
FIG. 1 Is a front, exploded, perspective view of a front base attachment directly secured to a novelty plate with a movable emblem, according to the present invention.
Figure 2:
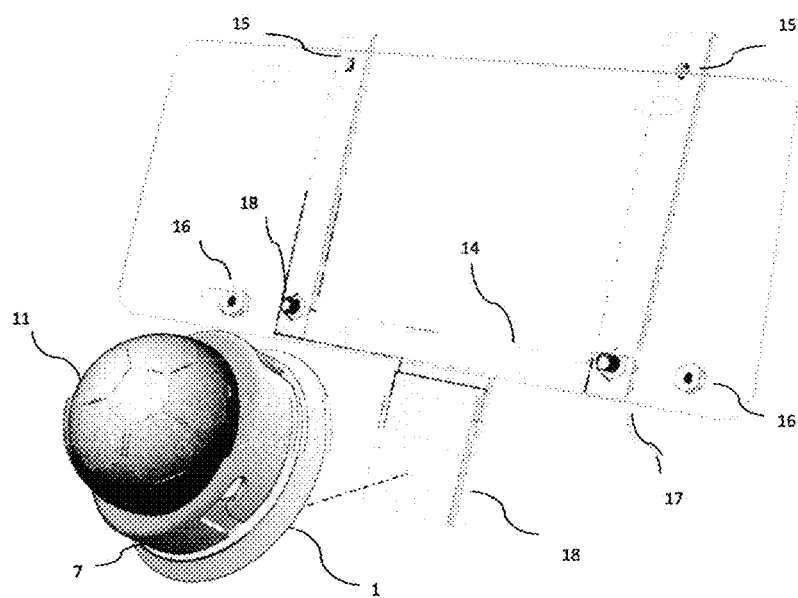
FIG. 2 Is a front, exploded, perspective view of a front lower base attachment and movable emblem, according to the present invention.
Figure 3:
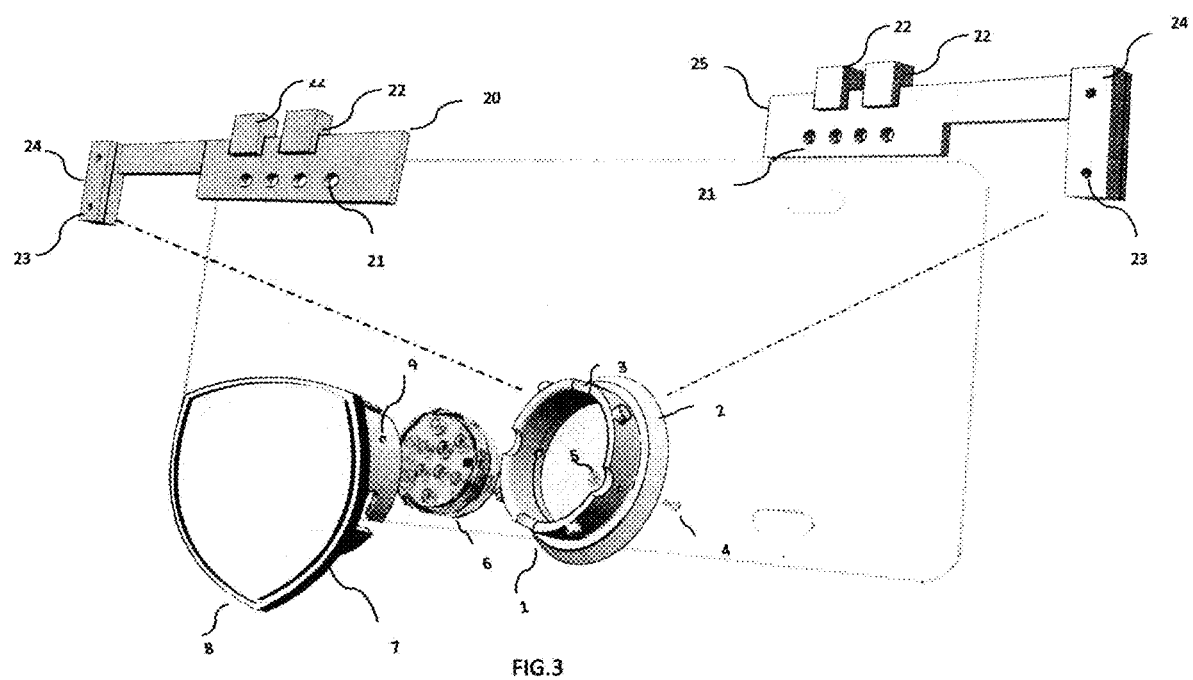
FIG. 3 Is a front, exploded, perspective view of the present invention, illustrating how a movable or fix emblem is secured in a position on the top left of the frame of a license or novelty plate, via a side attachment.

As shown in FIG. 1, attachment base 1 houses an optional LED light 6 that can be easily introduced or removed via strategically positioned indents 3. Also, attachment base 1 has a cone shaped translucent bottom 2 that helps to better diffuse the light that emanates from the optional LED apparatus Facing the LED light 6 toward the bottom will increase the light output to the license or novelty plate 20, while facing it up will instead focus the light output on the emblem 8. The attachment base 1 may conveniently be used to securely connect to a novelty or license plate 10 via glue, adhesive, or other methods. Numerous connection methods may be used to attach the base 1 and the plate 10 to the vehicle, including a conventional mechanism involving a screw which is inserted in aligning holes in the license or novelty plate 10, and vehicle. A top attachment 45 will connect with the attachment base 1 by aligning the receptacle 11 with the protuberance 12 and twisting and locking it into position. A hole 9 in the top casing 7 that houses an emblem 8 will then align with the hole 13 of the base attachment, while a screw 4 will be held in place by a nut 5. Such emblems 8 may be of a variety of designs, shapes, and sizes, some examples of which are shown in the accompanying drawings. For example, FIG. 2 shows an emblem 11 of a soccer ball which can be secured to the top casing 7. The front lower attachment 14 is designed to accommodate placement of an emblem 8 and the top casing 7 and the lower attachment 1 in the raised platform area 18 and secured via glue, adhesive or other method, this allows information on the plate 10 to be viewed, and does not interfere with components of the vehicle (not shown) in the area in which the plate 10 is attached to the vehicle. The front lower attachment 14 is placed in between the plate and the vehicle, numerous connection methods may be used to attach the front lower attachment 14 and the plate 10 to the vehicle, including a conventional mechanism involving a screw which is inserted in aligning holes 15 in the license or novelty plate 10, and vehicle, also for extra stability the bolts 16 included in the extremities of the front lower attachment 14 are inserted by aligning holes in the license or novelty plate 10, and secured with nuts 17. For example, the emblem 19 of a shield shown in FIG. 3 can be attached to the top left attachment 20 or the top right attachment 25 of the license or novelty plate, via the top casing 7 and the lower attachment 1 in the raised platform area 24 and secured via glue, adhesive or other methods. The top left attachment 20 and the top right attachment 25 are placed in between the plate 10 and the vehicle, numerous connection methods may be used to attach top left attachment 20 or the top right attachment 25 and the plate 10 to the vehicle, including a conventional mechanism involving a screw which is inserted in aligning receptacles 21 in the license or novelty plate 10, multiple receptacles 21 positions are possible and may be chosen based on aesthetic preference or by situational fit requirements for the particular vehicle or it may be dictated by the legal requirement to not obscure a particular portion of the license plate 10. Also the top left attachment 20 and the top right attachment 25 have for extra stability flaps which will snug on the top part of the license plate or novelty plate, which will allow weight distribution and will keep the attachment perpendicular and aligned to the license plate. A user may prefer to place one or more emblems 8 and the top attachment, the optional LED light 6 and the lower attachment 1 using the on the top right side attachment 25 and/or the top left side attachment 25 based on aesthetic preference or by situational fit requirements for the particular vehicle.

Figure 4:
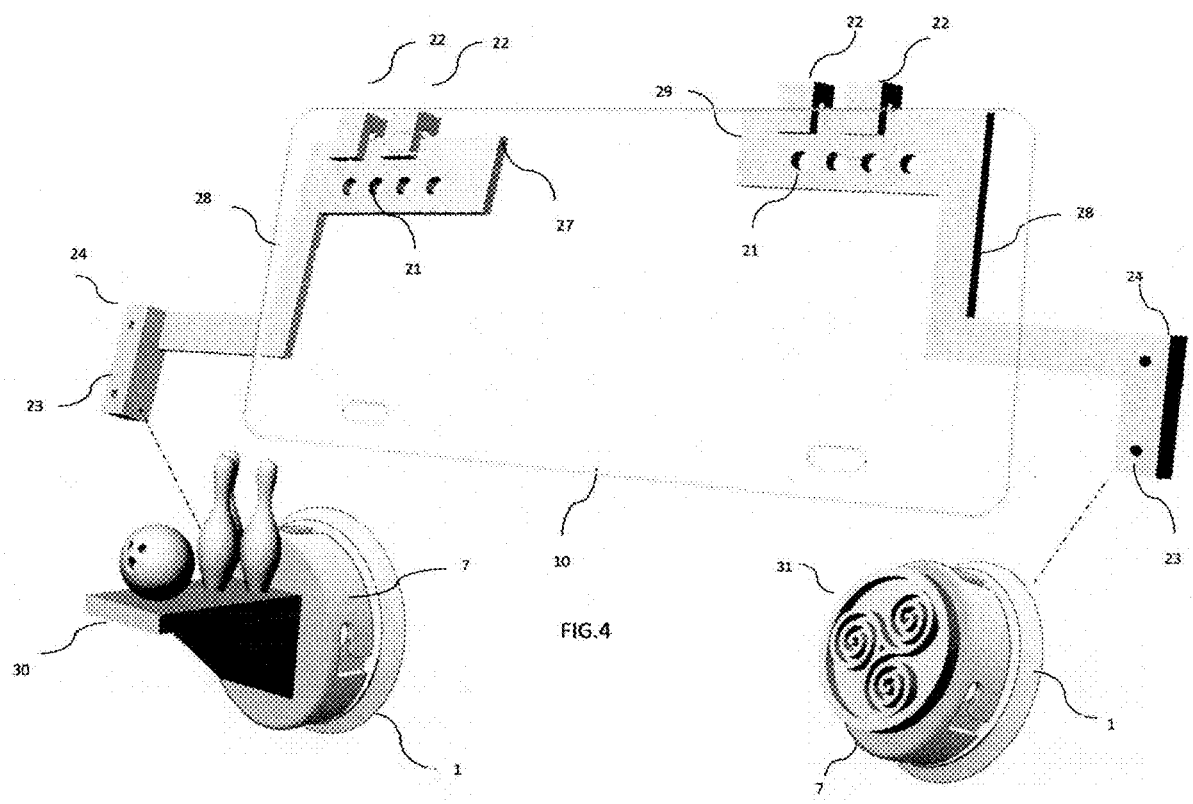
FIG. 4 Is a front, exploded, perspective view of the present invention, illustrating how a movable or fix emblem is secured in a position on the top right of the frame of a license or novelty plate, via a side attachment.

Similarly, a user may prefer to place one or more emblems 8 in the middle left or middle right side of the license or novelty plate 10, best illustrated by FIG. 4, having emblem 30 a bowling ball and pins connected to a top casing 7 and the lower attachment 1 in the raised platform area 24 secured via glue, adhesive or other methods of mid left attachment 27 and emblem 31 a depiction of a Triskele connected to a top casing 7 and the lower attachment 1 in the raised platform area 24 and secured via glue, adhesive or other methods of the mid right attachment 29. The mid left attachment 27 and the mid right attachment 29 are placed in between the plate 10 and the vehicle, numerous connection methods may be used to attach top left attachment 27 or the top right attachment 29 and the plate 10 to the vehicle, including a conventional mechanism involving a screw which is inserted in aligning receptacles 21 in the license or novelty plate 10, multiple receptacles 21 positions are possible and may be chosen based on aesthetic preference or by situational fit requirements for the particular vehicle or it may be dictated by the legal requirement to not obscure a particular portion of the license plate 10. Also the top left attachment 27 and top right attachment 29 have for extra stability flaps which will snug on the top part of the license plate or novelty plate, which will allow weight distribution and will keep the attachment perpendicular and aligned to the license plate.

Although the present invention has been described in terms of the presently preferred embodiments, it is to be understood that such disclosure is purely illustrative and is not to be interpreted as limiting. Consequently, without departing from the spirit and scope of the invention, various alterations, modifications, or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An attachment system for attachment of an interchangeable three-dimensional ornamental device to a motor vehicle, comprising:
    a base attachable to the motor vehicle and having fittings that receive complementary fittings of the ornamental device to enable the ornamental device to be removably secured to the base; and
    removably insertable within the base, a lighting unit comprising at least one light source that illuminates at least one of the base and the ornamental device,
    wherein the fittings comprise at least one protuberance and at least one receptacle that provide for twisting the ornamental device and the base into a locked position.

2. The attachment system of claim 1, wherein the base has a translucent ring encompassing a lower portion of the base that is configured to be illuminated by the lighting unit.

3. The attachment system of claim 1, wherein the lighting unit is configured to be inserted in one of two different orientations,
    wherein a first orientation comprises the light source facing the vehicle and illuminating a ring around the base, and wherein a second orientation comprises the light source facing away from the vehicle and illuminating the ornamental device.

4. The attachment system of claim 1, wherein the base has indentations positioned to receive protrusions of the lighting unit to secure the lighting unit in the base.

5. The attachment system of claim 1, wherein the fitting of the base includes protrusions that receive a slot in the ornamental device to secure the ornamental device to the base.

6. A device for interchangeably affixing an ornamental device to a vehicle, the device comprising:
    a base configured to house a lighting unit and having fittings to receive and removably mount the ornamental device thereon; and
    a lighting unit configured to be housed in the base beneath the ornamental device,
    wherein the fittings comprise at least one protuberance and at least one receptacle that provide for twisting the ornamental device and the base into a locked position.

7. The device of claim 6, wherein the base has a translucent ring encompassing a lower portion of the base that is configured to be illuminated by the lighting unit.

8. The device of claim 6, wherein the lighting unit is configured to be inserted in one of two different orientations, one orientation being such that the light source faces the vehicle and illuminates a ring around the base, and the other orientation being such that the light source faces away from the vehicle and illuminates the ornamental device.

9. The device of claim 6, wherein the base has indentations positioned to receive protrusions of the lighting unit to secure the lighting unit in the base.

10. The device of claim 6, wherein the fittings of the base includes protrusions that receive a slot in the ornamental device to secure the ornamental device to the base.

* * * * *